I. N. LEWIS.
INTERNAL COMBUSTION POWER APPARATUS.
APPLICATION FILED MAR. 29, 1909.
1,035,454.
Patented Aug. 13, 1912.
3 SHEETS—SHEET 1.
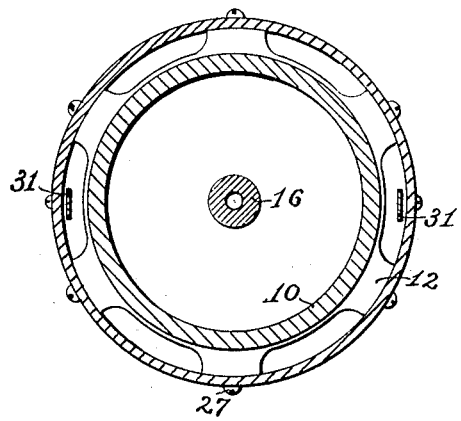
Fig. 4
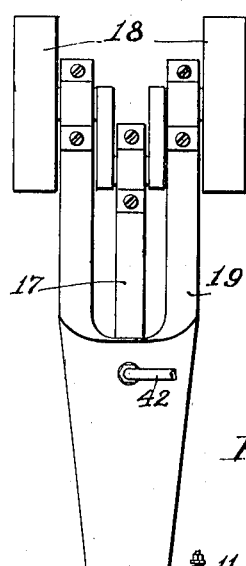
Fig. 1
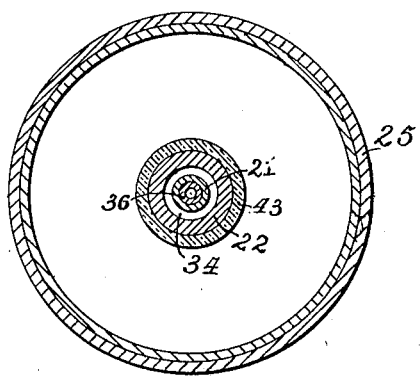
Fig. 5
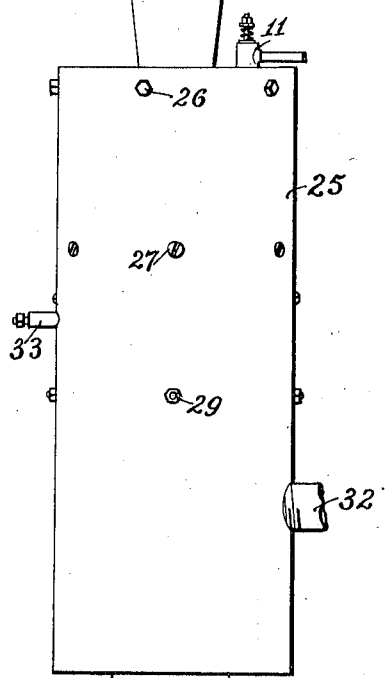
Witnesses
Gertrude Manning
Mary W. Darg
Inventor
I. N. Lewis
By Delbert H. Decker
Attorney

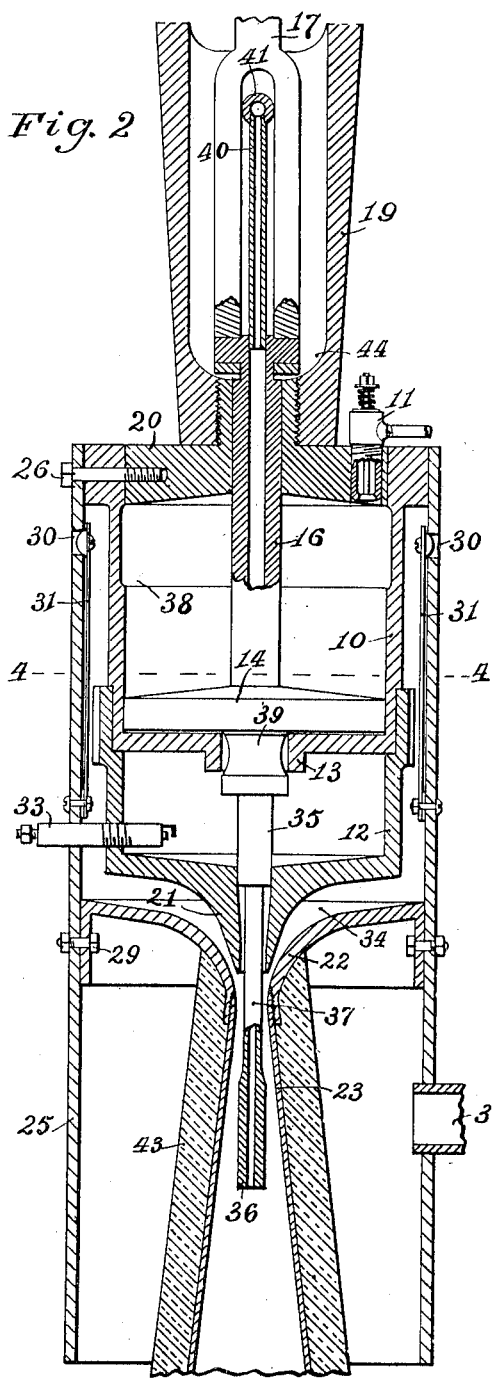
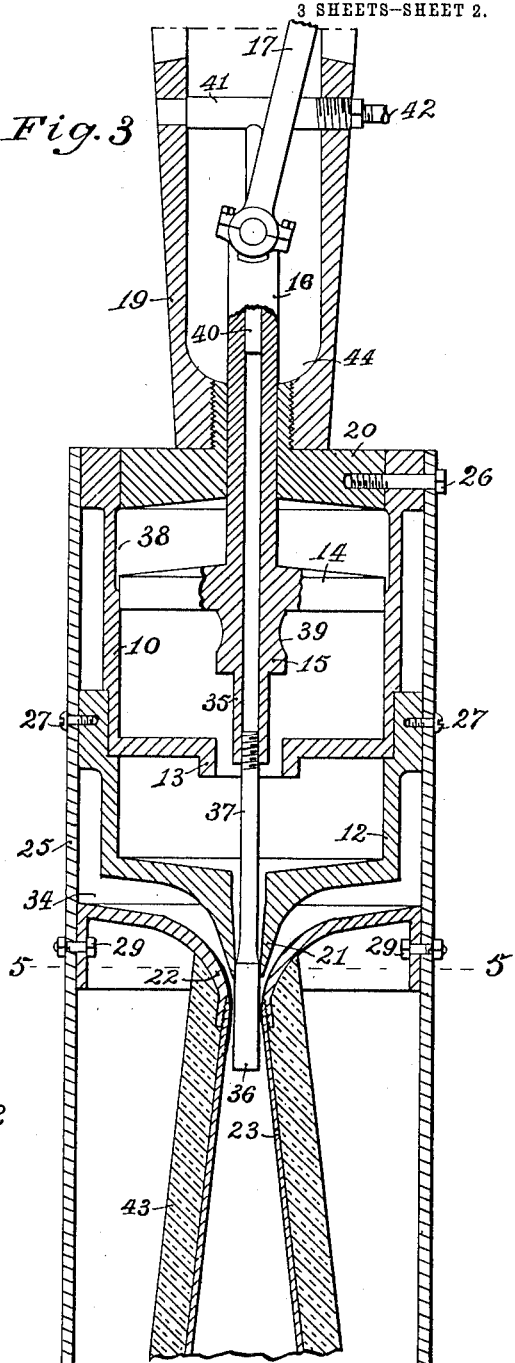

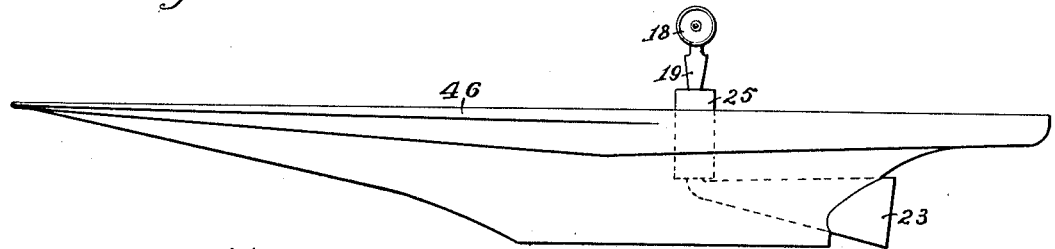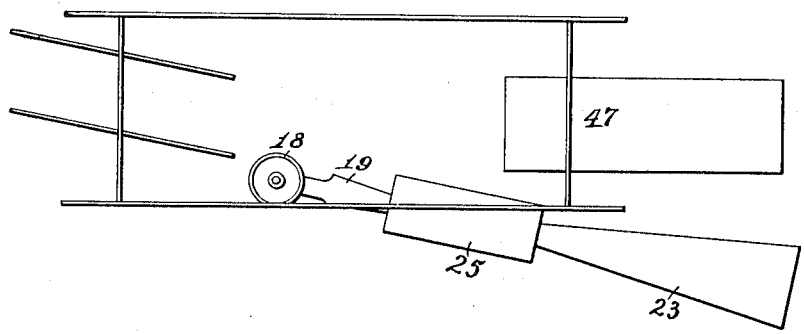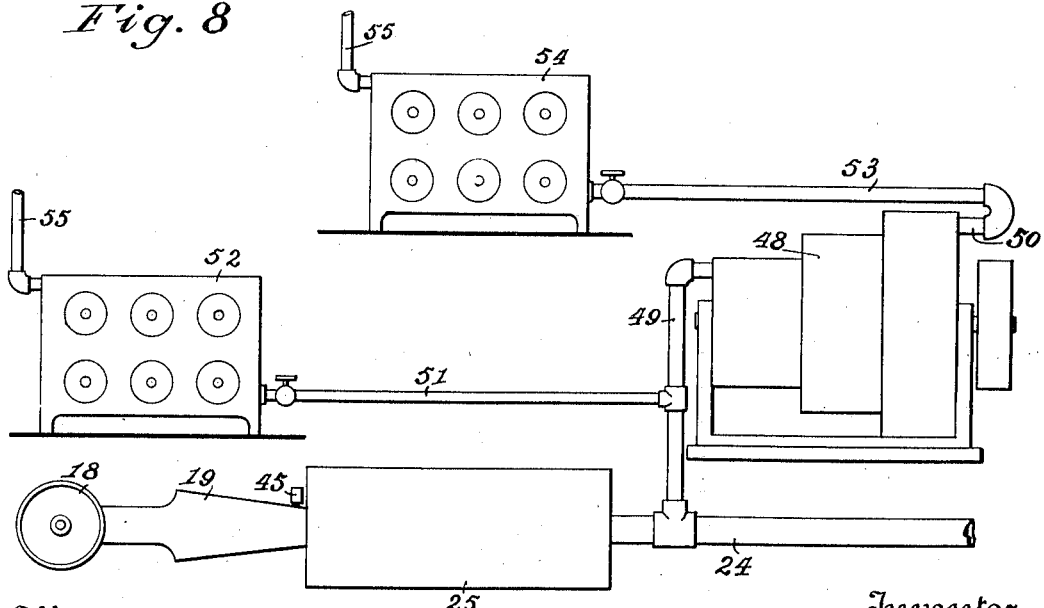

UNITED STATES PATENT OFFICE.

ISAAC N. LEWIS, OF THE UNITED STATES ARMY.

INTERNAL-COMBUSTION POWER APPARATUS.

1,035,454.  Specification of Letters Patent.  Patented Aug. 13, 1912.

Application filed March 29, 1909. Serial No. 486,615.

*To all whom it may concern:*

Be it known that I, ISAAC N. LEWIS, of the United States Army, a citizen of the United States, and stationed at Fo. tress Monroe, county of Elizabeth City, and State of Virginia, have invented a new and useful Improvement in Internal - Combustion Power Apparatus, of which the following is a specification.

This invention relates to power apparatus wherein by internal combustion there is utilized for the production of a gaseous motive agent the ordinary hydrocarbon fuels such as gasolene, kerosene, alcohol, denatured alcohol, and acetylene gas.

The object of the present invention is an apparatus by which such fuels may be most advantageously converted into gas at high pressure and high temperature for utilization in the direct propulsion of vehicles in air or in water or for driving turbine engines or for general heating purposes.

To this end the invention consists in the apparatus substantially as herein shown, described and claimed.

In the accompanying drawings, which form a part of this specification, Figure 1 is an elevation of the preferred form of apparatus embodying this invention; Fig. 2 is a vertical, transverse, medial section of the main portion of said apparatus; Fig. 3 is a similar section of said portion of the apparatus taken in the plane at right angles to that of the section seen in Fig. 2; Fig. 4 is a transverse section through the apparatus taken in the plane indicated by the line 4—4, Fig. 2; Fig. 5 is a transverse section of the apparatus taken in the plane indicated by the line 5—5, Fig. 3; Fig. 6 is a diagrammatic illustration of the application of this power apparatus to a boat; Fig. 7 is a like illustration of its application to a heavier-than-air flying machine; and Fig. 8 is a like representation showing the use of this apparatus in connection with a turbine engine and for heating purposes.

In the usual forms of reciprocating internal combustion engines, the useful work is accomplished by the employment of a piston which reciprocates in a cylinder and receives its energy directly from the highly heated gases at each explosion—the explosions taking place in the cylinder and the energy of the moving piston being transmitted through connecting mechanism to the power shaft. In the present invention, a piston is used, but it is not for driving a power shaft or its equivalent. The work, to which the apparatus is ancillary, is performed by the highly heated gases after they have left the cylinder and the explosion chamber. The only effective pressure applied to the piston at the moment of explosion is that necessary to cause it to draw in a fresh fuel charge, to force the charge into the explosion chamber, and to there compress it for ignition. The piston area exposed to contact with the heated products of combustion is proportionately small as compared to the whole piston area, and the explosion chamber itself is separate and distinct from the piston chamber.

In the apparatus as illustrated, 10 indicates the intake cylinder, to which the combustible compound may be supplied from a carbureter, or from any other suitable source, through an intake valve indicated at 11.

The combustion chamber is indicated at 12 and is connected with the intake cylinder through the tubular passage 13.

The piston is in reality a compound piston, the major portion 14, or larger piston, reciprocating in the cylinder 10 and the lesser portion 15, or smaller piston, fitted to the tubular passage 13. The part 14 serves as an intake piston while the part 15 serves as the propelling piston therefor.

The piston shaft is represented at 16 and to its upper end is journaled the pitman 17, through which the piston is connected to the fly-wheels 18. The fly-wheel may be associated in any suitable manner with the remaining part of the apparatus, as by mounting them in a bed piece 19, which as shown, may be screwed to a boss upon the cylinder head 20.

The outlet for the combustion chamber preferably forms part of an injector apparatus and is, therefore, made in the form of a nipple 21. About this nipple is concentrically arranged a conical suction tube 22, forming between it and the nipple an air passage through which air is drawn to increase the volume of the motive agent. To this conical tube may be attached the propeller nozzle 23 or the service pipe 24, Fig. 8.

The parts 10, 12 and 22 may be united in any suitable manner, but are preferably mounted within a cylindrical jacket 25 substantially in the manner shown in Figs. 2—5. When so mounted the cylinder 10 is provided with a flange about its upper end to which the jacket may be bolted, the bolts 26 serving at the same time to secure the cylinder head 20 in place. The upper end of the combustion chamber is preferably fitted, by a slip joint, to the cylinder 10 and has an interrupted flange by which it is connected to the jacket, as by screws 27. The interruptions 28 in this flange serve as air passages. The conical tube 22 is preferably extended into a partition across the jacket 25 and provided with a flange by means of which, through bolts 29, it may be connected to said jacket.

The jacket 25, while serving as a support for the parts therein, forms between it and them an air space, through which air is drawn for cooling the cylinder and combustion chamber. By this means also the air is warmed before it passes through the injector and becomes a part of the motive agent. The air is admitted to the interior of the jacket through valve-controlled openings 30 in the upper part thereof. These valves are preferably mounted on plate springs, as seen at 31. Air for the carbureter may also be taken from the space in the jacket surrounding the neck of the injector and the upper end of the nozzle 23, as through a tube indicated at 32, said air having entered the jacket at its open lower end.

Any suitable ignition device may be employed for firing the charge in chamber 12, an electric sparker therefor being typified at 33. The timer for the sparker may be of any desired type and operated from any of the moving parts suitable for that purpose. Neither the timer, nor its circuit and source of energy, nor the carbureter are shown, because their use and application are well known to those versed in this art and because they form no part of the present invention.

To control the exit from the chamber 12 and air space 34 a reciprocating double stopper is provided. This stopper forms an extension of the piston and consists of an upper plug 35 for intermittently closing the nipple 21 by entering the upper end thereof and a lower plug 36 for intermittently closing the lower end of nipple 21 and at the same time substantially closing, or throttling, the exit from the conical tube 22. These plugs are joined by the stem 37, smaller in diameter than either of them. By-passes are also provided for the passage of the combustible mixture around the parts of the piston. These may be provided in various forms and ways, as for example by increasing the interior diameter of the upper part of the cylinder 10, as at 38, and by restricting the diameter of a portion of the smaller piston 15, as at 39.

In the operation of the apparatus, the piston having started on the back stroke, the up-stroke in Figs. 2 and 3, the charge in combustion chamber 12 is fired as soon as the smaller piston closes the lower end of tube 13 and before plug 35 has been withdrawn from nipple 21. The force of the explosion then acting on piston 15 drives the compound piston back until part 14 enters the enlarged portion 38 of cylinder 10, when the combustible mixture or gas compressed above it, passes rapidly by and enters below piston 14. This movement of the gas is accelerated because, following the closure of the nipple 21 by the plug 36, the residue of gas below 14 has become rarefied. As the backward movement of the piston withdraws plug 35 from the nipple 21, the burnt gases rush out of the nipple and through the mouth of tube 22 into the nozzle 23, or pipe 24 as the case may be, and suck after them from around the chamber 12 and cylinder 10, the air that enters through openings 30. Then as the flywheels return the piston, a charge of fresh gas is drawn into cylinder through valve 11 and the charge ahead of piston 14 is forced into chamber 12 for compression and explosion as before. The rush of gas past piston 14 near the end of its up-stroke materially aids in scavenging cylinder 10 and the compression that takes place under piston 14 while the lower end of piston 15 is passing through tube 13 causes a swift rush of such portion of gas into chamber 12 and effects a thorough mixture of the fresh gas with any remnant of burnt gases that may remain. There can, however, be but a small percentage of burnt gases left in chamber 12, since the nipple is not closed by plug 35 until the fresh charge has had ample time to carry them ahead of it out through the nipple. Some of the fresh charge will usually be carried through the nipple before it is closed, but this will not be detrimental in any way, since it will be immediately burned because of the high temperature in the nozzle or service pipe. The high pressure due to the combustion in chamber 12 causes the burnt gases to issue through nipple 21 with great force and the last of the charge is accelerated by the piston on its forward stroke. Therefore, because of the rapid reciprocations of the piston a practically constant stream of the motive agent is supplied to the nozzle or to the service pipe. Any tendency of back pressure in the tube 22 on the back-stroke of the piston cannot force air out of openings 30, because of the valves closing them. Furthermore, such tendency is lessened by throttling the exit of the tube with the plug 36 and by the short period of suction that exists just prior to closing the lower end of the nipple 21 by plug 36. From this it will be seen that the apparatus serves simply to supply a volume of burnt gases at a high temperature to the nozzle 23 or to the service pipe 24 where they may be available for useful work. The piston apparatus is in reality but a pump aiding in supplying the combustible mixture to the combustion chamber and in forcibly expelling the burnt gases through the injector and out to the place of utilization. The piston and its fly-wheels do no other useful work unless to operate the spark timer. Furthermore, only so much energy is taken from the exploding mixture as is necessary to operate this pumping device, so that practically the entire energy in the fuel supplied to the combustion chamber is available for useful work in the motive agent as it enters the nozzle or the service pipe.

Aside from the external cooling effected by the air, as above described, internal cooling may also be provided. One way for effecting this is illustrated and consists in passing a cooling medium through the piston shaft. To this end the shaft is made hollow, as shown, and this hollow is extended through the piston and through the double stopper extension thereon, as shown in Figs. 2 and 3. The admission of the cooling agent to this channel may be effected, for example, by means of the tube 40 fitted to slide in the upper end of the piston rod. This tube branches from the header 41, transversely located in the bedpiece 19, and to this header the cooling agent may be supplied as by pipe 42. The pitman 17 is bifurcated to accommodate this header and its branching tube. The agent best adapted for this internal cooling is a hydrocarbon fluid, preferably a liquid, since, while cooling, it will itself be heated and vaporized and when it issues from the injector into the nozzle or the service pipe it will add fuel to the flame and energy to the motive agent. Water can be used and it will be converted into steam and that superheated, but it is not so desirable because its condensibility impairs the effectiveness of the motive agent in many of its uses. For jet propulsion particularly it is desirable that the motive agent contain no readily condensible constituent, that it be a permanent gas or a mixture of permanent gases, then in its traverse of the propeller nozzle there can be no decrease in volume due to condensation, and full force and effect of high temperature, high pressure and high velocity may be had. Through the external and internal cooling thus provided, the apparatus may be protected from damage by the heat generated therein. Suitable heat insulation may also be provided where desired, as by applying a coating thereof to the nozzle, as indicated in Figs. 2 and 3.

Lubrication of the piston and its rod may be effected in any suitable way and when the main part of the apparatus is located in a vertical position, as in Figs. 2, 3 and 6, lubrication is readily effected by pouring oil into the cup 44 formed at the lower end of the bed-piece 19. Thence it will work down along the piston rod to the sloping upper surface of the piston and to the walls of the cylinder and finally down through tube 13 and over plugs 35 and 36. The internal cooling, as described, aids also in making this mode of lubrication effective, since it keeps the oil from burning on the parts lubricated. By this mode of lubrication also the oil is discharged into the hot gases as they leave the injector and is there burned and so adds to the volume of the motive agent. When the apparatus is so located that it will not permit of supplying the oil in this manner, it may be applied in the usual way by adding oil cups where needed, as indicated at 45, Fig. 8.

As already seen, this apparatus is designed to supply a motive agent preferably composed of a permanent gas or gas produced by complete combustion of a mixture of air and hydrocarbon gas or gases. Its purpose is also to supply this motive agent at high temperature, high pressure, and high velocity, for the performance of useful work. The apparatus itself is not intended to do any useful work other than that required to produce the motive agent.

The product of this apparatus is especially adapted for jet propulsion. Where so used the propeller nozzle best suited for the purpose is an expanding one wherein the gas as it traverses the nozzle may expand in that ratio and to that degree best suited to an increase in velocity in accordance with the decrease in density and which will permit a decrease in temperature to nearly that of the resistant medium struck by the expelled gas.

In adapting this invention to boat propulsion, the main portion of the apparatus can advantageously be placed in an upright position and a bent nozzle used, as indicated in Figs. 1 and 6, the open end of the nozzle being below the water line at the stern of the boat typified at 46. A straight nozzle, such as seen in Fig. 7, may, however, be used in which case the main part of the apparatus would be placed in an inclined or horizontal position. The straight nozzle and inclined position are best adapted for use on an aeroplane typified at 47.

In applying the product of this motive power apparatus to driving a gas turbine, the motive agent discharged into the service pipe 24, may be led to the turbine indicated at 48, by a pipe 49 and the exhaust take place from the pipe 50.

In utilizing the motive gas for heating, a pipe as 51, may lead from the service pipe or from the branch pipe 49 to the radiator typified at 52. The exhaust from the turbine may also be utilized for heating, in which case the gas issuing from pipe 50 may be led, as by pipe 53, to a radiator typified at 54. From the radiators exhaust may take place to the open air, as by pipes 55.

Throughout the disclosure of this invention types of apparatus rather than exact forms of apparatus have been represented, since in the application of the invention, the parts and combinations of parts embodying the invention may be very widely varied.

The invention claimed is:—

1. In an internal combustion power apparatus, the combination with an intake cylinder for the explosive mixture and an intake piston therein, of a combustion chamber for receiving the charge from said intake cylinder, a piston integral with the intake piston and adapted to enter said combustion chamber and to be acted directly upon and driven by the explosions therein for the sole operation of the intake piston, and a device connected to said chamber for utilizing initially the live gases as they issue from the said chamber, substantially as set forth.

2. In an internal combustion power apparatus, the combination with an intake cylinder and an intake piston therein, of a combustion chamber for receiving the charge from said intake cylinder, a piston integral with the intake piston and adapted to enter said combustion chamber and to be driven by the explosions therein for the sole operation of the intake piston, means for utilizing the products of combustion as they issue from the combustion chamber, and an injector interposed between the combustion chamber and said means.

3. In an internal combustion power apparatus, a combustion chamber, a utilizing device for receiving the products of combustion as they issue from the combustion chamber, and mechanism operatively independent of said device and driven by the explosions in said chamber solely for the purpose of supplying succeeding charges of the explosive mixture to the selfsame chamber.

4. In an internal combustion apparatus the combination with a combustion chamber, of an intake cylinder, an intake piston in said cylinder provided with a driving portion adapted to enter the combustion chamber, said portion being so constructed and proportioned as to receive just sufficient repelling force from the explosion in the combustion chamber to operate the intake piston, and means for transmitting the contents of said cylinder to said chamber.

5. An apparatus for the production of a gaseous motive agent, comprising an intake cylinder, a combustion chamber connected therewith for receiving the charge from said intake cylinder, a compound piston having an intake portion in said cylinder and a driving portion adapted to enter said chamber and to be repelled by the explosion therein, and means distinct from and independent of said piston for utilizing the motive agent so produced.

6. An apparatus for the production of a gaseous motive agent, comprising an intake cylinder, a combustion chamber connected therewith for receiving the charge from said intake cylinder, a compound piston having an intake portion in said cylinder and a driving portion, the latter adapted to enter the selfsame combustion chamber and having an exposed area within said chamber sufficient only for the continued operation of the compound piston, and a device connected to said chamber for receiving and initially utilizing said motive agent.

7. In an apparatus for producing a gaseous motive agent, the combination with a combustion chamber and ignition means, of a pump solely for supplying fresh charges of explosive mixture to said chamber and for assisting in the expulsion of the motive agent from said chamber, said pump having a driving portion arranged to reciprocate in said chamber and to be directly driven by the explosions therein, substantially as set forth.

8. The combination of the combustion chamber, the cylinder communicating therewith through a central tubular passage, a compound piston having an intake portion in said cylinder and a propelling portion fitted to said tubular passage and adapted to intermittently enter it, and means for utilizing the live gases as they issue from the combustion chamber.

9. The combination of the combustion chamber and its exit, a cylinder communicating with the combustion chamber, a piston in the cylinder, and an extension on the piston provided with a plug for intermittently closing the exit from the combustion chamber.

10. The combination of the combustion chamber and its exit, a cylinder communicating with the combustion chamber, a piston in the cylinder, and an extension on said piston carrying two plugs for alternately closing said exit.

11. The combination with the combustion chamber having a nipple exit, of a conical air tube concentric with said nipple and forming therewith an injector, a cylinder communicating with said chamber, a piston in said cylinder, and an extension on the piston carrying plugs for alternately closing the nipple and throttling said air tube.

12. The combination of the combustion chamber having an exit, the cylinder communicating therewith through a central tubular passage, a compound piston having an intake portion in said cylinder and a propelling portion fitted to said tubular passage, and an extension on said piston carrying a plug for closing said exit simultaneously with the closing of the tubular passage by the propelling portion of the piston.

13. The combination of a combustion chamber, a cylinder in axial alinement therewith and separated therefrom by a wall having a central tubular passage, a compound piston having a portion in said cylinder and a smaller portion fitted to said tubular passage and a by-pass for that portion which enters the tubular passage.

14. The combination of the combustion chamber, the cylinder communicating therewith through a central tubular passage, the compound piston whereof the larger portion is in the cylinder and the smaller portion is fitted to said tubular passage, and by-passes provided for both portions of the piston.

15. The combination of a combustion chamber, a cylinder of substantially the same diameter and in axial alinement therewith and separated therefrom by a wall having a central cylinder-like passage of less diameter than said cylinder, a compound piston having a portion in said cylinder and a smaller portion fitted to said cylinder-like passage whereby the end of the said smaller portion may receive the force of the explosion in said chamber and be driven thereby for the sole operation of the compound piston.

16. In an apparatus for producing a gaseous motive agent by internal combustion, the combination with the combustion chamber, of an injector at the exit therefrom, and a conduit for hydrocarbon fluid extending through said chamber and opening into the throat of the injector.

17. In an apparatus for producing a gaseous motive agent by internal combustion, the combination with the combustion chamber, of an injector at the exit therefrom, a reciprocating piston entering said chamber and having a hollow rod, and means for passing a vaporizable fluid through said rod and piston and discharging it into the throat of the injector to augment the gaseous motive agent issuing through the injector.

18. In an apparatus for producing a gaseous motive agent by internal combustion, the combination with the combustion chamber, of an injector at the exit therefrom, a piston and piston rod and an extension from the piston into the throat of the injector all provided with a central channel, and means for supplying a cooling fluid to said channel.

19. In an apparatus for producing a gaseous motive agent by internal combustion, the combination with the combustion chamber, of an injector at the exit therefrom, a piston and piston rod and an extension from the piston into the throat of the injector all provided with a central channel, and a stationary tube fitted to the channel of the piston rod for supplying a vaporizable fluid to said channel for discharge into the motive agent issuing from the injector whereby to augment the volume of said agent.

20. The combination of the flanged cylinder and the combustion chamber having the nipple exit, of the jacket with its air inlets and within which said cylinder and chamber are mounted, the partition across said jacket and carrying the conical tube forming with said nipple an injector, and motive power utilizing means into which said injector discharges.

21. The combination of the flanged cylinder and the combustion chamber having the nipple exit, of the jacket with its air inlets and within which said cylinder and chamber are mounted, the partition across said jacket and carrying the conical tube forming with said nipple an injector, and an expanding nozzle connected to said tube for receiving the charge from said injector.

ISAAC N. LEWIS.

Witnesses:
M. W. TOWNSEND,
GEO. F. LEWIS.